(12) United States Patent
Wang

(10) Patent No.: US 11,368,820 B2
(45) Date of Patent: Jun. 21, 2022

(54) COMMUNICATION METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/075,609

(22) Filed: Oct. 20, 2020

(65) Prior Publication Data

US 2021/0037350 A1 Feb. 4, 2021

Related U.S. Application Data

(63) Continuation of application No. PCT/CN2019/104409, filed on Sep. 4, 2019.

(30) Foreign Application Priority Data

Oct. 8, 2018 (CN) .......................... 201811168975.X

(51) Int. Cl.
 *H04W 4/06* (2009.01)
 *H04W 48/16* (2009.01)

(52) U.S. Cl.
 CPC ............. *H04W 4/06* (2013.01); *H04W 48/16* (2013.01)

(58) Field of Classification Search
 CPC ....... H04W 4/06; H04W 4/08; H04W 72/005; H04W 72/042; H04W 4/10; H04W 36/0007; H04W 48/16
 See application file for complete search history.

(56) References Cited

U.S. PATENT DOCUMENTS 6,157,622 A * 12/2000 Tanaka ................. H04W 8/186
 340/7.46
10,075,883 B2 9/2018 Zhao et al.
 (Continued)

FOREIGN PATENT DOCUMENTS

CN 102448019 A 5/2012
CN 104243099 A 12/2014
 (Continued)

OTHER PUBLICATIONS

Tencent Technology, ISR, PCT/CN2019/104409, Nov. 28, 2019, 3 pgs.

(Continued)

*Primary Examiner* — Keith Ferguson
(74) *Attorney, Agent, or Firm* — Morgan, Lewis & Bockius LLP

(57) ABSTRACT

Embodiments of this application provide a communication method and apparatus, a non-transitory computer-readable storage medium, and an electronic device. The communication method for a wireless communication system is applied to a network side device, the method including: receiving group data transmitted by a transmitter device through an uplink channel; obtaining a target cell to which the group data is to be transmitted and a target transmission mode used for transmitting the group data to the target cell; and transmitting, based on the target transmission mode, the group data to the target cell through a downlink channel, for reception by a receiver device. In the technical solutions in the embodiments of this application, a group communication mechanism may be implemented with the assistance of the network side device, and a constructed device group can be effectively controlled through the network side device, thereby improving the reliability of group communication.

20 Claims, 3 Drawing Sheets

(56) References Cited

U.S. PATENT DOCUMENTS

| | | | |
|---|---|---|---|
| 2005/0288050 A1* | 12/2005 | Gill | H04W 72/005 |
| | | | 455/518 |
| 2012/0033605 A1 | 2/2012 | Yang et al. | |
| 2014/0064177 A1* | 3/2014 | Anchan | H04W 4/06 |
| | | | 370/312 |
| 2015/0173106 A1 | 6/2015 | Newberg et al. | |
| 2018/0255438 A1* | 9/2018 | Hua | H04W 4/08 |
| 2019/0239032 A1* | 8/2019 | Balasubramanian | |
| | | | H04W 84/18 |

FOREIGN PATENT DOCUMENTS

| | | | |
|---|---|---|---|
| CN | 105430621 A | 3/2016 | |
| CN | 105451194 A | 3/2016 | |
| CN | 105635989 A | 6/2016 | |
| CN | 107241701 A | 10/2017 | |
| CN | 107786946 A | 3/2018 | |
| CN | 109218995 A | 1/2019 | |
| WO | WO-2017041827 A1 * | 3/2017 | H04W 36/0007 |

OTHER PUBLICATIONS

Tencent Technology, WO, PCT/CN2019/104409, Nov. 28, 2019, 4 pgs.
Tencent Technology, IPRP, PCT/CN2019/104409, Apr. 8, 2021, 5 pgs.
Extended European Search Report, EP19871510.4 dated Oct. 5, 2021, 7 pgs.

\* cited by examiner

COMMUNICATION METHOD AND APPARATUS, COMPUTER-READABLE MEDIUM, AND ELECTRONIC DEVICE

CROSS REFERENCE TO RELATED APPLICATIONS

This application is a continuation application of PCT Patent Application No. PCT/CN2019/104409, entitled "COMMUNICATION METHOD AND APPARATUS, COMPUTER-READABLE MEDIUM AND ELECTRONIC DEVICE" filed on Sep. 4, 2019, which claims priority to Chinese Patent Application No. 201811168975.X, filed with the State Intellectual Property Office of the People's Republic of China on Oct. 8, 2018, and entitled "COMMUNICATION METHOD AND APPARATUS, COMPUTER-READABLE MEDIUM, AND ELECTRONIC DEVICE", all of which are incorporated herein by reference in their entirety.

FIELD OF THE TECHNOLOGY

This application relates to the field of computer and communication technologies, and specifically, to group communication in a wireless communication system.

BACKGROUND OF THE DISCLOSURE

The long term evolution (LTE) does not support a local area network (LAN) bearer in a standardized way. In a specific implementation, a terminal may be controlled to enable a soft Access Point (softAP) to implement a LAN based on a cellular system, and then a plurality of terminals are tethered to a plurality of LANs to implement communication. However, in this mode, there are uncontrollable problems, and the constructed LAN cannot be controlled effectively, leading to low reliability of group communication.

SUMMARY

The embodiments of this application provide a communication method and apparatus, a computer-readable medium, and an electronic device, to effectively control a device group at least to some extent, thereby improving the reliability of group communication.

Other features and advantages of this application become obvious through the following detailed descriptions or may be partially learned through the practice of this application.

According to an aspect of the embodiments of this application, a communication method for a wireless communication system is provided and is applied to a network side device, the method including: receiving group data transmitted by a transmitter device through an uplink channel; obtaining a target cell to which the group data is to be transmitted and a target transmission mode used for transmitting the group data to the target cell; and transmitting, based on the target transmission mode, the group data to the target cell through a downlink channel, for reception by a receiver device.

According to an aspect of the embodiments of this application, a communication apparatus for a wireless communication system is provided and includes: a receiving unit, configured to receive group data transmitted by a transmitter device through an uplink channel; a first obtaining unit, configured to obtain a target cell to which the group data is to be transmitted and a target transmission mode used for transmitting the group data to the target cell; and a transmission unit, configured to transmit, based on the target transmission mode, the group data to the target cell through a downlink channel, for reception by a receiver device.

In some embodiments of this application, based on the foregoing solutions, the first obtaining unit is configured to obtain an indication message transmitted by the transmitter device, and determine the target cell and the target transmission mode according to the indication message.

In some embodiments of this application, based on the foregoing solutions, the first obtaining unit is configured to obtain indication messages transmitted by the transmitter device for different data packets, to determine target transmission modes respectively corresponding to the different data packets.

In some embodiments of this application, based on the foregoing solutions, the first obtaining unit is configured to obtain the indication message from a designated packet header of a data packet transmitted by the transmitter device.

In some embodiments of this application, based on the foregoing solutions, an Ethernet packet header of the data packet that is transmitted by the transmitter device is compressed before the data packet is transmitted, the designated packet header including a Service Data Adaptation Protocol (SDAP) header, a Packet Data Convergence Protocol (PDCP) header, or a Radio Link Control (RLC) header.

In some embodiments of this application, based on the foregoing solutions, the communication apparatus for a wireless communication system further includes: a second obtaining unit, configured to obtain cell information about a cell in which user equipment is located; and a transmitting unit, configured to transmit the cell information about the cell in which the user equipment is located to the transmitter device, for determining, by the transmitter device according to the cell information about the cell in which the user equipment as the receiver device is located, the target cell to which the group data is to be transmitted.

In some embodiments of this application, based on the foregoing solutions, the second obtaining unit is configured to obtain location information about the user equipment, and determine the cell information about the cell in which the user equipment is located, according to the location information about the user equipment and coverage of the cell.

In some embodiments of this application, based on the foregoing solutions, the second obtaining unit is configured to obtain cell information about the cell in which the user equipment is located, the cell information being provided by the user equipment.

In some embodiments of this application, based on the foregoing solutions, the second obtaining unit is configured to receive cell information reported by the user equipment.

In some embodiments of this application, based on the foregoing solutions, the first obtaining unit is configured to determine the target cell and the target transmission mode according to a bearer mode of the group data during transmission.

In some embodiments of this application, based on the foregoing solutions, the first obtaining unit is configured to determine a data radio bearer (DRB) used by the group data during transmission, and use a cell and a transmission mode that are pre-configured and that correspond to the DRB used by the group data during transmission as the target cell and the target transmission mode.

In some embodiments of this application, based on the foregoing solutions, the first obtaining unit is configured to determine a network slice in which the group data is located during transmission, and use a cell and a transmission mode that are pre-configured and that correspond to the network slice in which the group data is located during transmission as the target cell and the target transmission mode.

In some embodiments of this application, based on the foregoing solutions, a data packet header of the group data carries group information, the group information being used for determining, by the receiver device, whether the group data is data transmitted to the receiver device.

In some embodiments of this application, based on the foregoing solutions, the first obtaining unit is configured to transmit different types of group data to a target device, in a case that the different types of group data use the same DRB during transmission; and obtain a target cell that is determined by the target device and to which the different types of group data need to be transmitted, and obtain a target transmission mode used for transmitting the different types of group data to the target cell.

In some embodiments of this application, based on the foregoing solutions, the target transmission mode includes unicast, broadcast, and multicast.

According to an aspect of the embodiments of this application, a non-transitory computer-readable storage medium is provided, storing a plurality of computer programs, the computer programs, when executed by one or more processors of an electronic device, causing the electronic device to implement the communication method for a wireless communication system according to the foregoing embodiments.

According to an aspect of the embodiments of this application, an electronic device is provided, including: one or more processors; and a storage apparatus, configured to store one or more programs, the one or more programs, when executed by the one or more processors, causing the electronic device to implement the communication method for a wireless communication system according to the foregoing embodiments.

In the technical solutions provided in some embodiments of this application, by receiving group data transmitted by a transmitter device through an uplink channel, and obtaining a target cell to which the group data is to be transmitted and a target transmission mode, the group data is transmitted to the target cell through a downlink channel based on the target transmission mode, so that a group communication mechanism may be implemented with the assistance of a network side device (for example, a base station or an application server) in a wireless communication system (for example, a 5G system), and a constructed device group can be effectively controlled through the network side device, thereby improving the reliability of group communication.

It is to be understood that, the foregoing general descriptions and the following detailed descriptions are merely for illustration and explanation purposes and are not intended to limit this application.

DESCRIPTION OF EMBODIMENTS

At present, the examples of implementations are described comprehensively with reference to the accompanying drawings. However, the examples of implementations may be implemented in a plurality of forms, and it is not to be understood as being limited to the examples described herein. Conversely, the implementations are provided to make this application more comprehensive and complete, and comprehensively convey the idea of the examples of the implementations to a person skilled in the art.

In addition, the described characteristics, structures, or features may be combined in one or more embodiments in any appropriate manner. In the following descriptions, a lot of specific details are provided to give a comprehensive understanding of the embodiments of this application. However, a person of ordinary skill in the art is to be aware that, the technical solutions in this application may be implemented without one or more of the particular details, or another method, unit, apparatus, or step may be used. In other cases, well-known methods, apparatuses, implementations, or operations are not shown or described in detail, in order not to obscure the aspects of this application.

The block diagrams shown in the accompany drawings are merely functional entities and do not necessarily correspond to physically independent entities. That is, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely exemplary descriptions and do not necessarily include all of the content and operations/steps, nor are they necessarily performed in the sequence described. For example, some operations/steps may be further divided, and some operations/steps may be combined or partially combined. Therefore, an actual execution sequence may be changed according to an actual situation.

Figure 1:
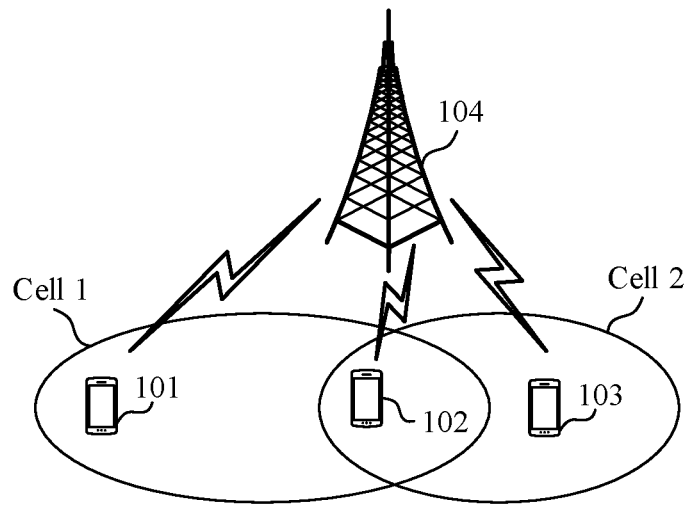
FIG. 1 is a schematic diagram of an exemplary system architecture to which a technical solution according to an embodiment of this application may be applied.

FIG. 1 is a schematic diagram of an exemplary system architecture to which a technical solution according to an embodiment of this application may be applied.

As shown in FIG. 1, the system architecture may include user equipment 101, user equipment 102, user equipment 103, and a base station 104. The user equipment 101, the user equipment 102, and the user equipment 103 may be a smartphone, a tablet computer, a portable computer, a desktop computer, or the like. The user equipment 101 and the user equipment 102 are located in a cell 1, the user equipment 102 and the user equipment 103 are located in a cell 2, and the user equipment 101, the user equipment 102, and the user equipment 103 form a communication group.

It is to be understood that, the quantities of user equipments and base stations shown in FIG. 1 are merely an example. There may be any quantity of user equipments and base stations according to an actual requirement.

In an embodiment of this application, after the base station 104 (or another network side device, for example, an application server located in a core network or at a network edge) receives group data (which may be group data transmitted to the user equipment 101 and the user equipment 103) transmitted by the user equipment 102 through an uplink channel, target cells (that is, the cell 1 and the cell 2) to which the group data is to be transmitted and a target transmission mode (for example, unicast, multicast, or broadcast) used for transmitting the group data to the target cells may be obtained, and then the group data may be transmitted to the target cells based on the determined target transmission mode through a downlink channel, for reception by receiver devices (that is, the user equipment 101 and the user equipment 103). In view of the above, in the technical solutions in the embodiments of this application, a group communication mechanism may be implemented with the assistance of a network side device (for example, a base station or an application server), and a constructed device group can be effectively controlled through the network side device, thereby improving the reliability of group communication.

The implementation details of the technical solutions in the embodiments of this application are described in detail in the following.

Figure 2:
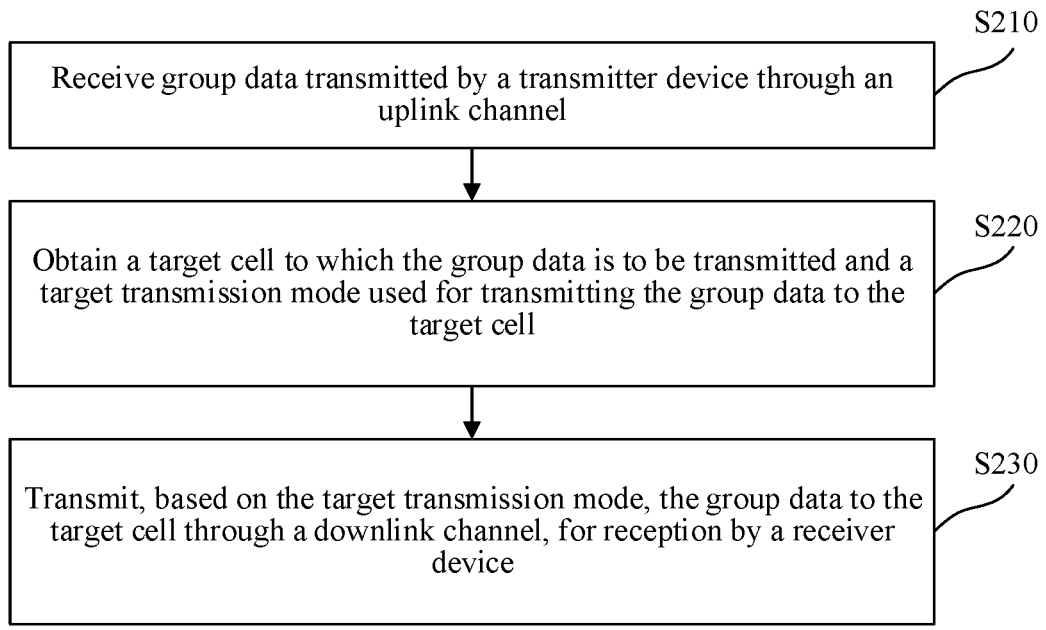
FIG. 2 is a schematic flowchart of a communication method according to an embodiment of this application.

FIG. 2 is a schematic flowchart of a communication method according to an embodiment of this application. The communication method may be used for a wireless communication system provided in the embodiments of this application, and may be implemented by a network side device, for example, may be implemented by a base station or an application server located in a core network or at a network edge. With reference to FIG. 2, the communication method includes at least step S210 to step S230. A detailed description is as follows:

Step S210. Receive group data transmitted by a transmitter device through an uplink channel.

In an embodiment of this application, the transmitter device may be a smartphone, a tablet computer, a portable computer, a desktop computer, or the like, which is used as user equipment (UE). The uplink channel used by the transmitter device to transmit the group data may be an uplink channel in a 5G communication system, and the group data transmitted by the transmitter device is data that is to be transmitted to another user equipment in the same group in which the transmitter device is located. The user equipment in the same group in which the transmitter device is located may be located in the same cell, or may be located in a different cell, that is, user equipment in each group is not limited by cell planning in mobile communication. At the same time, a transmitter device in a different group may be designated by the network side device. Alternatively, each piece of user equipment actively determines whether to be used as the transmitter device.

Step S220. Obtain a target cell to which the group data is to be transmitted and a target transmission mode used for transmitting the group data to the target cell.

In an embodiment of this application, the target transmission mode includes unicast, broadcast, and multicast. Specific implementations of step S220 are described in detail in the following.

Implementation 1:

In an embodiment of this application, an indication message transmitted by a transmitter device may be obtained, and then the target cell and the target transmission mode are determined according to the indication message. That is, in the technical solution in this embodiment, the target cell to which the group data is to be transmitted and the transmission mode used are determined according to the indication message transmitted by the transmitter device.

In an embodiment of this application, indication messages transmitted by the transmitter device for different data packets may be obtained, to determine target transmission modes respectively corresponding to the different data packets. That is, the transmitter device may indicate a transmission mode based on each data packet, thereby improving the flexibility of transmitting the group data.

In an embodiment of this application, the indication message may be obtained from a designated packet header of a data packet transmitted by the transmitter device. If an Ethernet packet header of the data packet that is transmitted by the transmitter device is compressed before the data packet is transmitted, a multicast address in the data packet is removed. Therefore, another packet header (for example, an SDAP header, a PDCP header, or an RLC header) not compressed may be selected according to a compression status of the data packet and the indication message is added to the another packet header.

In an embodiment of this application, when the indication message indicates a specific transmission mode, the transmission mode may be represented by using two bits, that is, by using two bits in a corresponding packet header. For example, broadcast is represented by using "00", unicast is represented by using "01", and multicast is represented by using "11".

In an embodiment of this application, the network side device may further obtain cell information about a cell in which each piece of user equipment is located, and then transmit the cell information about the cell in which the each piece of user equipment is located to the transmitter device, for determining, by the transmitter device according to the cell information about the cell in which the each piece of user equipment is located, the target cell to which the group data is to be transmitted.

In an embodiment of this application, when obtaining the cell information about the cell in which the each piece of user equipment is located, the network side device may obtain location information about the each piece of user equipment, and then determine, according to the location information about the each piece of user equipment and coverage of each cell, the cell information about the cell in which the each piece of user equipment is located.

In an embodiment of this application, when obtaining the cell information about the cell in which the each piece of user equipment is located, the network side device may obtain cell information about a cell in which each piece of user equipment is located, the cell information being provided by another network side device. For example, the application server may obtain cell information about a cell in which each piece of user equipment is located, the cell information being provided by the base station or a core network element.

In an embodiment of this application, when obtaining the cell information about the cell in which the each piece of user equipment is located, the network side device may receive cell information reported by each piece of user equipment.

Implementation 2:

In an embodiment of this application, the target cell and the target transmission mode may be determined according to a bearer mode of the group data during transmission.

Optionally, in an embodiment of this application, a DRB used by the group data during transmission may be determined, and then a cell and a transmission mode that are pre-configured and that correspond to the DRB used by the group data during transmission are used as the target cell and the target transmission mode. That is, in this embodiment, the target cell to which the group data is to be transmitted and the target transmission mode used may be determined according to the DRB used by the group data during transmission.

In an embodiment of this application, a network slice in which the group data is located during transmission may be further determined, and then a cell and a transmission mode that are pre-configured and that correspond to the network slice in which the group data is located during transmission are used as the target cell and the target transmission mode. That is, in this embodiment, the target cell to which the group data is to be transmitted and the target transmission mode used may be determined according to the network slice in which the group data is located during transmission.

In an embodiment of this application, for the technical solution in the implementation 2, group information may be carried in a data packet header of the group data, to help a receiver device to determine, according to the group information, whether the group data is data transmitted to the receiver device.

Implementation 3

In an embodiment of this application, in a case that different types of group data use the same DRB during transmission, the different types of group data are transmitted to a target device, to obtain a target cell that is determined by the target device and to which the different types of group data need to be transmitted, and obtain a target transmission mode used for transmitting the different types of group data to the target cell. That is, in the technical solution in this embodiment, when the different types of group data are mixed on one DRB, the target cell to which the different types of group data need to be transmitted and the target transmission mode used may be determined with the assistance of the target device (for example, an edge computing device or an application server).

Still referring to FIG. 2, in step S230, the group data is transmitted to the target cell through a downlink channel based on the target transmission mode, for reception by the receiver device.

In an embodiment of this application, the receiver device may be a device in the same communication group in which the transmitter device is located. The transmitter device and the receiver device may be located in the same cell, or may be located in different cells. When the receiver device and the transmitter device are located in the same cell, the target cell is a cell in which the transmitter device is located.

In the technical solution in this embodiment shown in FIG. 2, a group communication mechanism may be implemented with the assistance of a network side device in a wireless communication system, and a constructed device group can be effectively controlled through the network side device, thereby improving the reliability of group communication.

By using group communication performed in a 5G communication system as an example, the technical solution in the embodiments of this application is described in detail in the following.

Figure 3:
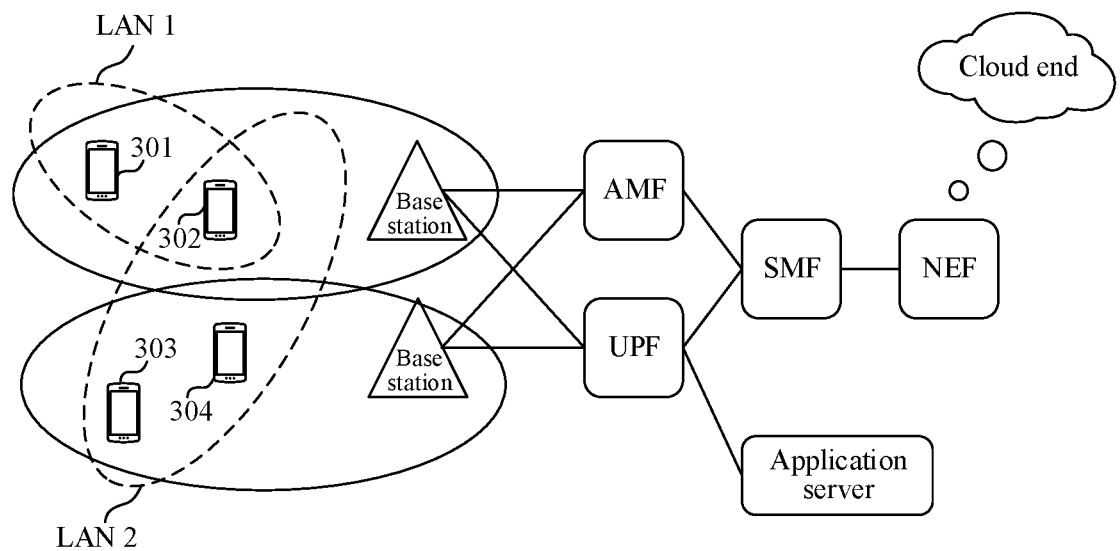
FIG. 3 is a schematic diagram of an application scenario of a technical solution according to an embodiment of this application.

In an embodiment of this application, as shown in FIG. 3, user equipment 301 and user equipment 302 belong to a 5G LAN 1, and the user equipment 302, user equipment 303, and user equipment 304 belong to another 5G LAN 2. All user equipments (that is, the user equipment 301 and the user equipment 302) in the 5G LAN 1 are located in the same cell, and user equipments in the 5G LAN 2 are located in different cells (that is, a cell in which the user equipment 303 and the user equipment 304 are located is different from a cell in which the user equipment 302 is located). For a case that all user equipments in a 5G LAN are located in the same cell, group data transmitted between the user equipments does not need to be forwarded through an interface between base stations during transmission; while for a case that user equipments in a 5G LAN are located in different cells, group data transmitted between the user equipments is to be forwarded between base stations. However, a latency in the forwarding between the base stations has impact on a latency in data transmission. When determining whether the group data is to be forwarded between the base stations, it is necessary to determine whether 5G LAN devices are located in the same cell, that is, a network side device is to maintain location information about each piece of user equipment, to further determine cells/sectors and even beam sets on which the group data is transmitted. An AMF shown in FIG. 3 is an access and mobility management function entity, a UPF is a user port function entity, an SMF is a service management point, and an NEF is a network element function.

In an embodiment of this application, the network side device that maintains location information about the 5G LAN device may be an application server shown in FIG. 3 (the application server may be a 5G LAN application server), or may be a base station or another network element (for example, SMF). The location information about the 5G LAN device may be information about a cell or cell set bearing the 5G LAN or information about a sector of a cell or a beam set bearing the 5G LAN.

In this embodiment of this application, the solution for collecting and maintaining the location information about the 5G LAN device may include the following embodiments.

Embodiment 1 of collecting and maintaining the location information about the 5G LAN device:

Cell information about a cell in which the 5G LAN device is located is determined by the network side device based on a physical location of the 5G LAN device. Specifically, the network side device may obtain a specific physical location of each 5G LAN device, and then determine, according to coverage data of a cell in which the 5G LAN device is located and the specific physical location, cell information about the cell in which the 5G LAN device is located. The technical solution in this embodiment is suitable for a relatively simple deployment of 5G cells. If a plurality of cells are close deployed, actual cell coverage may be affected by powers of different base stations and interference factors, which results in irregular coverage, and further leads to a lack of accuracy of the determined cell information about the cell in which the 5G LAN device is located.

Embodiment 2 of collecting and maintaining the location information about the 5G LAN device:

The location information about the 5G LAN device is determined based on network capability exposure. Specifically, some network-side elements (for example, the base station or a core network element) may expose context information of a terminal to a 5G LAN server. The technical solution in this embodiment requires the assistance of 5G network capability exposure.

Embodiment 3 of collecting and maintaining the location information about the 5G LAN device:

The location information about the 5G LAN device is determined based on a report of an application layer of a terminal. Specifically, the terminal may transmit, at the application layer, cell information about a cell in which the 5G LAN device is located to the network side device, for example, transmit the cell information to the 5G LAN application server.

In an embodiment of this application, when the 5G LAN device is to transmit group data, the group data may be used as uplink data and be transmitted to the network side device (for example, the base station or a function entity co-located with the base station, for example, an edge computing entity. Descriptions are provided below by using the base station as an example). The base station may determine, according to its own functions, whether to process the group data by itself or further forward the group data to the 5G LAN application server for processing. There may be the following two embodiments of the case that the base station determines to process the group data by itself.

Embodiment 1

In an embodiment of this application, when transmitting the group data to the network side device, a transmitter device is to indicate, to the base station, a cell in which a receiver device of the group data is located (for example, whether the receiver device is located in the same cell in which the transmitter device is located), and whether to use unicast, broadcast or multicast for downlink transmission when transmitting the group data. The implementation premise of the technical solution in this embodiment is that an application layer of the transmitter device understands a cell location of a cell in which the receiver device (or a receiver group) is located. For example, the network side device may transmit the collected and maintained location information about the device to the transmitter device in advance.

Figure 4:
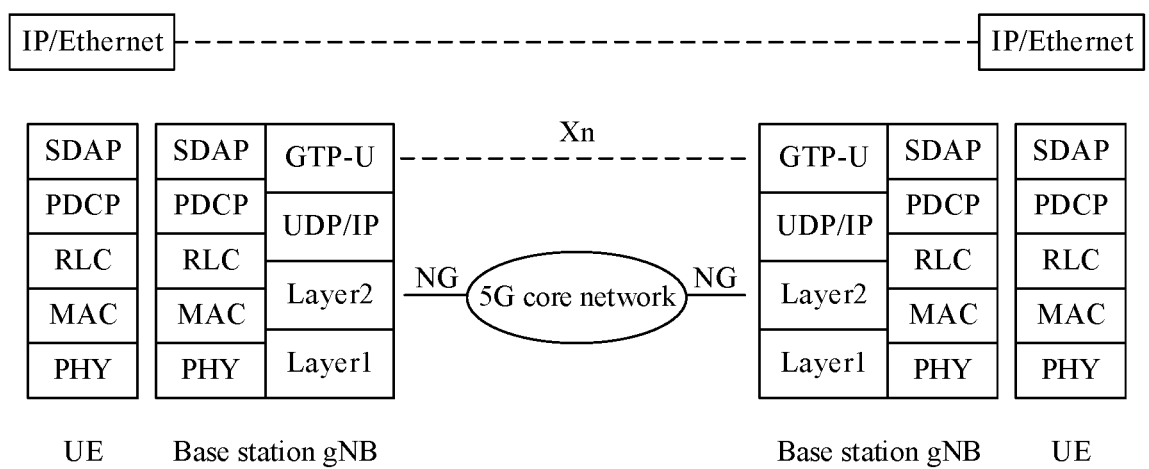
FIG. 4 is a schematic diagram of a user-plane protocol stack of a 5G LAN according to an embodiment of this application.

In an embodiment of this application, specific information indicated by the device to the base station may be reflected in a corresponding data packet. Specifically, according to a compression status of the data packet, bits of indication information that is to be introduced can be added to a packet header, for example, added to an IP header, a PDCP header, or an RLC packet header. More specifically, for a user-plane protocol stack of a 5G LAN shown in FIG. 4, if an Ethernet packet header of the data packet that is transmitted by the transmitter device is compressed before the data packet is transmitted, a multicast address in the data packet is removed. Therefore, another packet header (for example, an SDAP header, the PDCP header, or the RLC header. If the IP header is not compressed, the indication information may also be added to the IP header) not compressed may be selected according to a compression status of the data packet and the bits are added to the another packet header for indicating. MAC shown in FIG. 4 is Media Access Control, a PHY is a port physical layer, a GTP-U is a GPRS Tunneling Protocol User Plane, a UDP is a User Datagram Protocol, an Xn interface is an interface between base stations gNBs, and an NG interface is an interface between a base station gNB and a 5G core network. Some air interface protocol stacks after packet header compression are removed at a transmitting end and restored at a receiving end.

In an embodiment of this application, the specific information indicated by the device to the base station may also be reflected in UE context configured on a control plane.

In an embodiment of this application, when the device gives indications, a transmission mode may be determined for each data packet, that is, the device can perform unicast or multicast transmission on data packets in a 5G LAN group without relying on an address indication in a data packet header.

Embodiment 2

In an embodiment of this application, when transmitting the group data to the network side device (for example, the base station), a transmitter device does not indicate, to the base station, a cell in which a receiver device is located, or whether to use unicast, broadcast or multicast for downlink transmission when transmitting the group data, but the indication is implemented by the base station according to context configured by the network side device.

In an embodiment of this application, the network side device may maintain a forwarding table, to determine a transmission location and a transmission mode of 5G LAN data through the forwarding table. Specifically, as shown in Table 1, if different 5G LAN data is differentiated based on DRBs on a terminal side, the forwarding table may be configured according to DRB IDs. For example, all data of a DRB 1 is broadcasted in a downlink of a current cell (that is, a cell in which the transmitter device is located), and data of a DRB 2 is unicasted in the downlink of the current cell and forwarded to a neighboring cell.

TABLE 1

|  | Downlink transmission mode of the current cell | Whether to be forwarded to another cell? |
| --- | --- | --- |
| DRB 1 | Broadcast | No |
| DRB 2 | Unicast | Yes |
| . . . | . . . | . . . |

In another embodiment of this application, as shown in Table 2, if different 5G LAN data may belong to different network slices, the forwarding table may be configured according to IDs (for example, S-NSSAI, that is, Single Network Slice Selection Assistance Information) of the network slices. As shown in Table 2, all data of a network slice 1 is broadcasted in a downlink of a current cell (that is, a cell in which the transmitter device is located), and data of a network slice 2 is unicasted in the downlink of the current cell and forwarded to a neighboring cell.

TABLE 2

|  | Downlink transmission mode of the current cell | Whether to be forwarded to another cell? |
| --- | --- | --- |
| Network slice 1 | Broadcast | No |
| Network slice 2 | Unicast | Yes |
| . . . | . . . | . . . |

In the technical solution in Embodiment 2, the network side device does not need to depend on the indication of the 5G LAN device. However, each data packet is to carry group information of the 5G LAN (for example, a unicast address, a multicast address, or a broadcast address), to help the receiver device to determine, according to the group information, whether a data packet is transmitted to the receiver device.

In an embodiment of this application, if the base station cannot determine a cell to which the group data is transmitted, the group data may be transmitted to the 5G LAN application server (or an edge computing device on a network side). The 5G LAN application server determines a cell or cells to which the group data is transmitted through a downlink mode. Specifically, for example, if different 5G LAN data is mixed on one DRB, and cannot be distinguished at an access stratum (AS), the base station may transmit the 5G LAN data to the 5G LAN application server to forward the 5G LAN data above an IP layer, that is, to determine a cell or cells to which the 5G LAN data is to be forwarded above the IP layer, and whether the data is transmitted through unicast, multicast or broadcast during forwarding.

In an embodiment of this application, the multicast and the broadcast in the foregoing embodiments may be implemented based on the unicast (that is, transmission is performed to N target terminals through N times of downlink transmission), or may be implemented based on a multimedia broadcast multicast service (MBMS) technology, or may be implemented based on a single cell-point to multi-point (SC-PTM) technology or another new broadcast mechanism introduced in 5G.

The technical solution in the foregoing embodiments in this application is suitable for transmitting data packets such as an IP packet or a non-IP packet and an Ethernet packet between industrial control devices in a high-reliability and low-latency way by using a 5G-based air interface in a future factory environment, thereby meeting requirements of Industrial Internet of Things (IIoT) for a low latency and a high reliability. Moreover, the technical solution in the embodiments in this application may be integrated in an industrial control device, or may be independently deployed.

The foregoing embodiments in this application are described by using group communication performed in a 5G communication system as an example. The technical solution in the embodiments in this application is also suitable for another wireless communication system.

The following describes apparatus embodiments of this application, and the apparatus embodiments may be used for performing the communication method for a wireless communication system in the foregoing embodiments of this application. For details not disclosed in the apparatus embodiments of this application, reference may be made to the foregoing embodiments of the communication method for a wireless communication system of this application.

Figure 5:
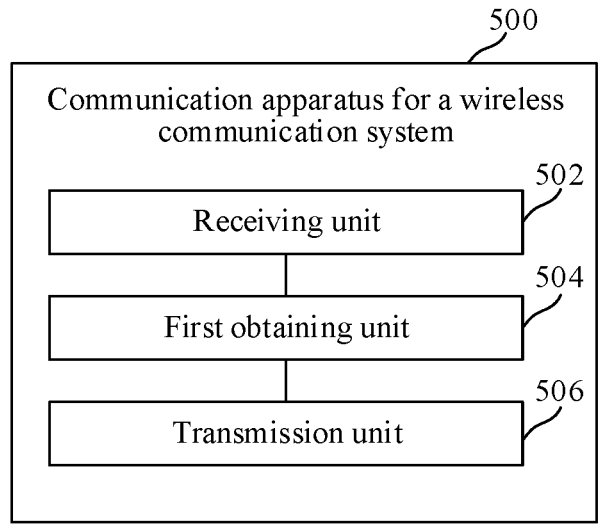
FIG. 5 is a schematic block diagram of a communication apparatus according to an embodiment of this application.

FIG. 5 is a schematic block diagram of a communication apparatus according to an embodiment of this application. The communication apparatus may be used for a wireless communication system provided in the embodiments of this application.

Referring to FIG. 5, a communication apparatus 500 for a wireless communication system is provided according to this embodiment of this application and includes: a receiving unit 502, a first obtaining unit 504, and a transmission unit 506.

The receiving unit 502 is configured to receive group data transmitted by a transmitter device through an uplink channel; the first obtaining unit 504 is configured to obtain a target cell to which the group data is to be transmitted, and obtain a target transmission mode used for transmitting the group data to the target cell; and the transmission unit 506 is configured to transmit, based on the target transmission mode, the group data to the target cell through a downlink channel, for reception by a receiver device.

In an embodiment of this application, the first obtaining unit 504 is configured to obtain an indication message transmitted by the transmitter device, and determine the target cell and the target transmission mode according to the indication message.

In an embodiment of this application, the first obtaining unit 504 is configured to obtain indication messages transmitted by the transmitter device for different data packets, to determine target transmission modes respectively corresponding to the different data packets.

In an embodiment of this application, the first obtaining unit 504 is configured to obtain the indication message from a designated packet header of a data packet transmitted by the transmitter device.

In an embodiment of this application, an Ethernet packet header of the data packet that is transmitted by the transmitter device is compressed before the data packet is transmitted, the designated packet header including an SDAP header, a PDCP header, or an RLC header.

In an embodiment of this application, the communication apparatus 500 for a wireless communication system further includes: a second obtaining unit, configured to obtain cell information about a cell in which user equipment is located; and a transmitting unit, configured to transmit the cell information about the cell in which the user equipment is located to the transmitter device, for determining, by the transmitter device according to the cell information about the cell in which the user equipment as the receiver device is located, the target cell to which the group data is to be transmitted.

In an embodiment of this application, the second obtaining unit is configured to obtain location information about the user equipment, and determine the cell information about the cell in which the user equipment is located, according to the location information about the user equipment and coverage of the cell.

In an embodiment of this application, the second obtaining unit is configured to obtain cell information about the cell in which the user equipment is located, the cell information being provided by the user equipment.

In an embodiment of this application, the second obtaining unit is configured to receive cell information reported by the user equipment.

In an embodiment of this application, the first obtaining unit 504 is configured to determine the target cell and the target transmission mode according to a bearer mode of the group data during transmission.

In an embodiment of this application, the first obtaining unit 504 is configured to determine a DRB used by the group data during transmission, and use a cell and a transmission mode that are pre-configured and that correspond to the DRB used by the group data during transmission as the target cell and the target transmission mode.

In an embodiment of this application, the first obtaining unit 504 is configured to determine a network slice in which the group data is located during transmission, and use a cell and a transmission mode that are pre-configured and that correspond to the network slice in which the group data is located during transmission as the target cell and the target transmission mode.

In an embodiment of this application, a data packet header of the group data carries group information, the group information being used for determining, by the receiver device, whether the group data is data transmitted to the receiver device.

In an embodiment of this application, the first obtaining unit 504 is configured to transmit different types of group data to a target device, in a case that the different types of group data use the same DRB during transmission; and obtain a target cell that is determined by the target device and to which the different types of group data need to be transmitted, and obtain a target transmission mode used for transmitting the different types of group data to the target cell.

In an embodiment of this application, the target transmission mode includes unicast, broadcast, and multicast.

Figure 6:
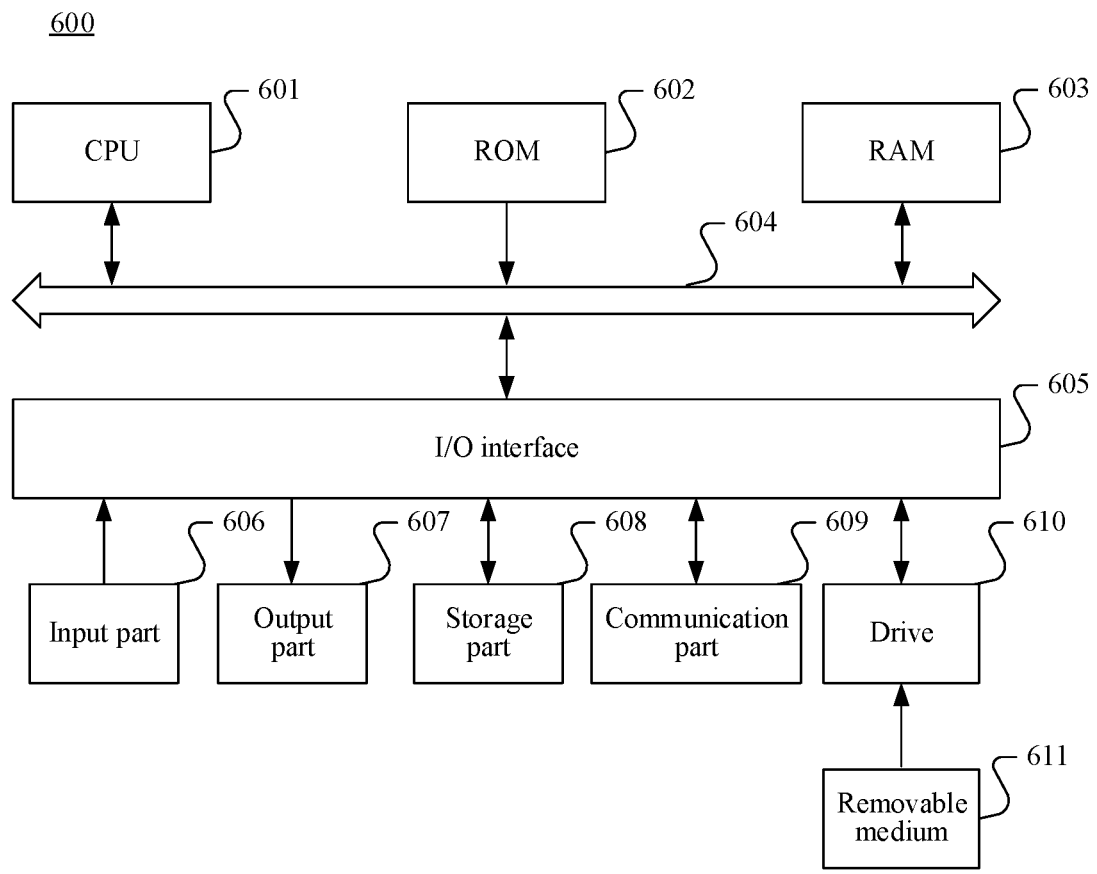
FIG. 6 is a schematic structural diagram of a computer system adapted to implement an electronic device according to an embodiment of this application.

FIG. 6 is a schematic structural diagram of a computer system adapted to implement an electronic device according to an embodiment of this application.

A computer system 600 of the electronic device shown in FIG. 6 is merely an example, and does not constitute any limitation on functions and use ranges of the embodiments of this application.

As shown in FIG. 6, the computer system 600 includes a central processing unit (CPU) 601, which may perform various proper actions and processing based on a program stored in a read-only memory (ROM) 602 or a program loaded from a storage part 608 into a random access memory (RAM) 603. The RAM 603 further stores various programs and data required for system operations. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard, a mouse, or the like, an output part 607 including a cathode ray tube (CRT), a liquid crystal display (LCD), a speaker, or the like, a storage part 608 including a hard disk, or the like, and a communication part 609 including a network interface card such as a LAN card or a modem. The communication part 609 performs communication processing through a network such as the Internet. A drive 610 is also connected to the I/O interface 605 as required. A removable medium 611 such as a magnetic disk, an optical disc, a magneto-optical disk, or a semiconductor memory is installed on the drive 610 as required, so that a computer program read from the removable medium 611 is installed into the storage part 608 as required.

Particularly, according to the embodiments of this application, the processes described below by referring to the flowcharts may be implemented as computer software programs. For example, this embodiment of this application includes a computer program product, the computer program product includes a computer program carried on a computer-readable medium, and the computer program includes program code used for performing the methods shown in the flowcharts. In such an embodiment, the computer program may be downloaded and installed through the communication part 609 from a network, and/or installed from the removable medium 611. When the computer program is executed by the central processing unit (CPU) 601, the various functions defined in the system of this application are executed.

The computer-readable medium shown in the embodiments of this application may be a computer-readable signal medium or a computer-readable storage medium or any combination the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, an apparatus, or a device. In this application, a computer-readable signal medium may include a data signal being in a baseband or propagated as a part of a carrier wave, the data signal carrying computer-readable program code. Such a propagated data signal may be in a plurality of forms, including but not limited to an electromagnetic signal, an optical signal, or any suitable combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The program code included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions and operations that may be implemented by a system, a method, and a computer program product according to various embodiments of this application. In this aspect, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

A related unit described in the embodiments of this application may be implemented in a software manner, or may be implemented in a hardware manner, and the unit described can also be set in a processor. Names of these units do not constitute a limitation on the units in a case.

An embodiment of this application further provides a computer program product including an instruction, the computer program product, when run on a server, causing the server to perform the method according to the foregoing embodiments.

According to another aspect, this application further provides a computer-readable medium. The computer-readable medium may be included in the electronic device described in the foregoing embodiments, or may exist alone and is not disposed in the electronic device. The computer-readable medium carries one or more programs, the one or more programs, when executed by the electronic device, causing the electronic device to implement the method described in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. Conversely, features and functions of one module or unit described above may be further divided into a plurality of modules or units for implementation. In this application, the term "module" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the present disclosure, a person skilled in the art can readily think of other implementations of this application. This application is intended to cover any variations, uses or adaptation of this application following the general principles of this application, and includes the well-known knowledge and conventional technical means in the art and undisclosed in this application.

It is to be understood that this application is not limited to the accurate structures that are described above and that are shown in the accompanying drawings, and modifications and changes may be made without departing from the scope of this application. The scope of this application is limited by the appended claims only.

What is claimed is:

1. A communication method for a wireless communication system, comprising:
   receiving, by a network side device, group data transmitted by a transmitter device through an uplink channel, the group data including a plurality of different data packets;
   obtaining, by the network side device, a target cell to which the group data is to be transmitted and a target transmission mode used for transmitting the group data to the target cell, including obtaining, by the network side device, a plurality of indication messages transmitted by the transmitter device for the plurality of different data packets;
   determining the target transmission mode including a plurality of data transmission modes that correspond to the plurality of different data packets; and
   transmitting, by the network side device based on the target transmission mode, the group data to the target cell through a downlink channel, for reception by a receiver device.

2. The communication method according to claim 1, wherein the obtaining, by the network side device, the indication messages transmitted by the transmitter device comprises:
   obtaining, by the network side device, the indication messages from a designated packet header of a data packet transmitted by the transmitter device.

3. The communication method according to claim 2, wherein an Ethernet packet header of the data packet that is transmitted by the transmitter device is compressed before the data packet is transmitted, the designated packet header comprising a Service Data Adaptation Protocol (SDAP) header, a Packet Data Convergence Protocol (PDCP) header, or a Radio Link Control (RLC) header.

4. The communication method according to claim 1, further comprising:
   obtaining, by the network side device, cell information about a cell in which user equipment is located; and
   transmitting, by the network side device, the cell information about the cell in which the user equipment is located to the transmitter device, for determining, by the transmitter device according to the cell information about the cell in which the user equipment as the receiver device is located, the target cell to which the group data is to be transmitted.

5. The communication method according to claim 4, wherein the obtaining, by the network side device, cell information about a cell in which user equipment is located comprises:
   obtaining, by the network side device, location information about the user equipment; and
   determining, by the network side device, the cell information about the cell in which the user equipment is located, according to the location information about the user equipment and coverage of the cell.

6. The communication method according to claim 4, wherein the obtaining, by the network side device, cell information about a cell in which user equipment is located comprises:
   obtaining, by the network side device, cell information about the cell in which the user equipment is located, the cell information being managed by the network side device itself.

7. The communication method according to claim 4, wherein the obtaining, by the network side device, cell information about a cell in which user equipment is located comprises:
   receiving, by the network side device, cell information reported by the user equipment.

8. The communication method according to claim 1, wherein the obtaining, by the network side device, a target cell to which the group data is to be transmitted and a target transmission mode used for transmitting the group data to the target cell comprises:
   determining, by the network side device, the target cell and the target transmission mode according to a bearer mode of the group data during transmission.

9. The communication method according to claim 8, wherein the determining, by the network side device, the target cell and the target transmission mode according to a bearer mode of the group data during transmission comprises:
   determining, by the network side device, a data radio bearer (DRB) used by the group data during transmission; and
   using, by the network side device, a cell and a transmission mode that are pre-configured and that correspond to the DRB used by the group data during transmission as the target cell and the target transmission mode.

10. The communication method according to claim 8, wherein the determining, by the network side device, the target cell and the target transmission mode according to a bearer mode of the group data during transmission comprises:
    determining, by the network side device, a network slice in which the group data is located during transmission; and using, by the network side device, a cell and a transmission mode that are pre-configured to correspond to the network slice in which the group data is located during transmission as the target cell and the target transmission mode.

11. The communication method according to claim 8, wherein a data packet header of the group data carries group information, the group information being used for determining, by the receiver device, whether the group data is data transmitted to the receiver device.

12. The communication method according to claim 1, wherein the obtaining, by the network side device, a target cell to which the group data is to be transmitted and a target transmission mode used for transmitting the group data to the target cell comprises:
transmitting, by the network side device, different types of group data to a target device, in a case that the different types of group data use one DRB during transmission; and
obtaining, by the network side device, a target cell that is determined by the target device and to which the different types of group data is to be transmitted and a target transmission mode used for transmitting the different types of group data to the target cell.

13. The communication method according to claim 1, wherein the target transmission mode comprises unicast, broadcast, and multicast.

14. An electronic device, comprising:
one or more processors; and
a storage apparatus, configured to store one or more programs, the one or more programs, when executed by the one or more processors, causing the electronic device to:
receive group data transmitted by a transmitter device through an uplink channel, the group data including a plurality of different data packets;
obtain a target cell to which the group data is to be transmitted and a target transmission mode used for transmitting the group data to the target cell, including obtaining a plurality of indication messages transmitted by the transmitter device for the plurality of different data packets;
determine the target transmission mode including a plurality of data transmission modes that correspond to the plurality of different data packets; and
transmit, based on the target transmission mode, the group data to the target cell through a downlink channel, for reception by a receiver device.

15. The electronic device according to claim 14, wherein the obtain a target cell to which the group data is to be transmitted and a target transmission mode used for transmitting the group data to the target cell comprises:
determine the target cell and the target transmission mode according to a bearer mode of the group data during transmission.

16. The electronic device according to claim 14, wherein the obtain a target cell to which the group data is to be transmitted and a target transmission mode used for transmitting the group data to the target cell comprises:

transmit different types of group data to a target device, in a case that the different types of group data use one DRB during transmission; and
obtain a target cell that is determined by the target device and to which the different types of group data need to be transmitted, and obtaining a target transmission mode used for transmitting the different types of group data to the target cell.

17. A non-transitory computer-readable storage medium, storing a plurality of computer programs, the computer programs, when executed by one or more processors of an electronic device, causing the electronic device to:
receive group data transmitted by a transmitter device through an uplink channel, the group data including a plurality of different data packets;
obtain a target cell to which the group data is to be transmitted and a target transmission mode used for transmitting the group data to the target cell, including obtaining a plurality of indication messages transmitted by the transmitter device for the plurality of different data packets; and
determine the target transmission mode including a plurality of data transmission modes that correspond to the plurality of different data packets; and
transmit, based on the target transmission mode, the group data to the target cell through a downlink channel, for reception by a receiver device.

18. The non-transitory computer-readable storage medium of claim 17, further comprising:
obtaining cell information about a cell in which user equipment is located; and
transmitting the cell information about the cell in which the user equipment is located to the transmitter device, for determining, by the transmitter device according to the cell information about the cell in which the user equipment as the receiver device is located, the target cell to which the group data is to be transmitted.

19. The non-transitory computer-readable storage medium of claim 17, wherein obtaining a target cell to which the group data is to be transmitted and a target transmission mode used for transmitting the group data to the target cell comprises:
determining the target cell and the target transmission mode according to a bearer mode of the group data during transmission.

20. The non-transitory computer-readable storage medium of claim 17, wherein obtaining a target cell to which the group data is to be transmitted and a target transmission mode used for transmitting the group data to the target cell comprises:
transmitting different types of group data to a target device, in a case that the different types of group data use one DRB during transmission; and
obtaining the target cell that is determined by the target device and to which the different types of group data is to be transmitted and the target transmission mode used for transmitting the different types of group data to the target cell.

* * * * *